US012800022B2

(12) United States Patent
Pluchon

(10) Patent No.: US 12,800,022 B2
(45) Date of Patent: Nov. 17, 2026

(54) BALL SCREW ASSEMBLIES

(71) Applicant: Ratier-Figeac SAS, Figeac (FR)

(72) Inventor: Etienne Pluchon, Montfaucon (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 19/248,788

(22) Filed: Jun. 25, 2025

(65) Prior Publication Data

US 2025/0389325 A1 Dec. 25, 2025

(30) Foreign Application Priority Data

Jun. 25, 2024 (EP) .................................... 24184474

(51) Int. Cl.
*F16H 57/04* (2010.01)
*F16H 25/22* (2006.01)

(52) U.S. Cl.
CPC ..... *F16H 57/0424* (2013.01); *F16H 25/2204* (2013.01); *F16H 57/0471* (2013.01)

(58) Field of Classification Search
CPC ............. F16H 57/0424; F16H 25/2204; F16H 57/0471
See application file for complete search history.

(56) References Cited

U.S. PATENT DOCUMENTS 5,809,838 A * 9/1998 Miyaguchi .......... F16H 25/2214 74/89.44
7,634,952 B2 * 12/2009 Chen ................... F16H 57/0497 74/89.44
8,746,409 B2 6/2014 Chiang et al.
10,895,309 B2 * 1/2021 Holding .............. F16H 25/2418
11,719,385 B2 * 8/2023 Vermande ........... F16H 25/2204 184/6
2016/0298757 A1 10/2016 Miyazaki et al.
2021/0131552 A1 5/2021 Houdard et al.

FOREIGN PATENT DOCUMENTS

CN 213298723 U 5/2021
EP 3318781 B1 9/2020
EP 3809020 A1 * 4/2021 ......... F16H 57/0497
JP 2008002566 A 1/2008
JP 2009197861 A 9/2009

OTHER PUBLICATIONS

European Search Report for Application No. 24184474.5, mailed Nov. 20, 2024, 10 pages.

* cited by examiner

*Primary Examiner* — Zakaria Elahmadi
(74) *Attorney, Agent, or Firm* — CANTOR COLBURN LLP

(57) ABSTRACT

A ball screw comprising a screw shaft, a ball nut, and a load circuit. The load circuit includes a first and second part. The screw shaft is longitudinally extending with a longitudinal central axis (A) and at least part of the longitudinally extending surface of the screw shaft comprises an external thread. The first part of the load circuit comprises a part of the external thread. The ball nut includes a body, a bore, and the second part of the load circuit, and a lubricant channel. The bore is defined by the body, is longitudinally extending with a longitudinal central axis, has a first and second end, and has a longitudinally extending surface extending at least partially between the first and second ends. The first and second ends of the bore each comprise a mouth, and each mouth opens through an outside surface of the body.

14 Claims, 7 Drawing Sheets

BALL SCREW ASSEMBLIES

CROSS-REFERENCE TO RELATED APPLICATIONS

This application claims the benefit of European Patent Application No. 24184474.5 filed Jun. 25, 2024, the disclosure of which is incorporated herein by reference in its entirety.

TECHNICAL FIELD

This disclosure relates to ball screw assemblies, and in particular to the lubrication of ball screw assemblies.

BACKGROUND

Ball screw assemblies typically comprise a screw shaft and a ball nut. One of the screw shaft and the ball nut rotates relative to the other and the relative longitudinal position of the ball nut on the screw shaft changes as a result of that relative rotation. The relative rotational motion is converted to relative longitudinal motion or relative longitudinal motion is converted to relative rotational motion via a plurality of ball bearings that interact with both the screw shaft and the ball nut. Hereafter, reference to "ball" or "balls" is a reference to ball bearings.

The screw shaft is typically cylindrical, longitudinally extending with a central axis and a lateral surface. Typically the lateral surface comprises one or more external threads. Each external tread is so configured that it provides an open channel or raceway along which ball bearings may travel.

A channel or raceway is open if it does not surround ball bearings passing along the channel. A channel or raceway is closed if it substantially or wholly surrounds ball bearings passing along the channel.

The ball nut typically comprises a body with a cylindrical bore extending through the body. The bore comprises one or more internal or inside threads, and one or more ball return or recirculation systems. Each internal tread is so configured that each internal thread provides an open channel or raceway along which ball bearings may travel.

The external and internal threads of the screw shaft and ball nut are so configured that when the screw shaft extends through the bore the external and internal threads can, together, define one or more closed channels or raceways along which ball bearings may travel.

The ball return system typically comprises a ball return channel that extends through, or partially through and partially externally to the body of the ball nut between a first axial position and a second axial locations on the closed channel or raceway. The ball return channel allows ball bearings to travel between the first and second axial locations on the closed channel or raceway along the ball return channel.

When the rotation of the screw shaft relative to the ball nut is in a first direction, ball bearings travel along the closed channel or raceway from the first end of the ball return channel/first axial location on the closed channel or raceway to the second axial location on the closed channel or raceway/second end of the ball return channel. The ball bearings then enter the ball return channel through the second end and travel along the ball return channel until they reach the first end of the ball return channel. The ball bearings then exit the second end of the ball return channel into the closed raceway. The ball bearings repeat that circuit for as long as the relative rotation of the screw shaft and ball nut continues. The circuit travelled by the ball bearings may be referred to as a return circuit or a load circuit. Relative rotation of the screw shaft and ball nut in the opposite direction causes the ball bearings to travel around the load circuit in the opposite direction.

Typically the ball nut further comprises a ball nut seal or wiper located at or adjacent each end of the bore/internal thread. Each ball nut seal is retained by the ball nut. The ball nut seal has one or more internal threads which closely mate with the or each external thread. Each ball nut seal forms a seal between the ball nut and the screw shaft that is substantially lubricant tight, wholly lubricant tight, or allows up to a predetermined maximum flow rate of lubricant to exit from the ball screw.

In an embodiment of the above embodiment, at least one ball nut seal is retained in fixed position relative to the ball nut body.

In an embodiment of the above embodiment, at least one ball nut seal is retained in an axially floating relationship to the body.

To lubricate the ball screw assembly, and to reduce friction and wear in the assembly, lubricant such as oil or grease is typically introduced into one or more of the closed channel or raceway and ball return channel through an oil or grease hole.

According to the present disclosure there is provided an improved ball screw. The improved ball screw is configured to allow for improved lubrication of the ball screw. The improved ball screw also allows increased intervals between servicing and/or refilling the ball screw with lubricant.

SUMMARY

According to the present disclosure there is provided an improved ball screw. The improved ball screw is configured to allow for improved lubrication of the ball screw. The improved ball screw also allows increased intervals between servicing and/or refilling the ball screw with lubricant.

According to a first aspect of the present disclosure there is provided a ball screw including a screw shaft, a ball nut, and a load circuit. The load circuit includes a first and second part. The screw shaft is longitudinally extending with a longitudinal central axis and at least part of the longitudinally extending surface of the screw shaft comprises an external thread, and the first part of the load circuit comprises a part of the external thread. The ball nut comprises a body, a bore, the second part of the load circuit, and a lubricant channel. The bore is defined by the body, is longitudinally extending with a longitudinal central axis, has a first and second end, and has a longitudinally extending surface extending at least partially between the first and second ends. The first and second ends of the bore each comprise a mouth, and each mouth opens through an outside surface of the body. The longitudinally extending surface of the bore comprises an internal thread, and the first part of the load circuit comprises at least a part of the internal thread. The screw shaft extends through the bore of the ball nut and the screw shaft and bore are so configured that they are co-axial. The external thread and internal thread are so configured that the external thread and the internal thread together define the first part of the load circuit. The first part of the load circuit extends a distance along the bore and at least part of the second part of the load circuit extends through the ball nut. The lubricant channel comprises a first and a second lubricant channel end and a flow path between the first and second lubricant channel ends. Rotation around the longitudinal axis of one of the screw shaft and the ball nut relative to the other causes axial movement of the ball nut relative to the screw shaft. The ball screw further comprises a shuttle, the shuttle is engaged with the longitudinally extending surface of the screw shaft and is in sliding contact with the ball nut. Rotation of one of the screw shaft and the ball nut relative to the other around the longitudinal axis causes the shuttle to impel lubricant along the lubricant channel.

It is to be understood that all references to a longitudinal axis, longitudinal central axis, longitudinal direction, use of axial or like terminology, and use of radial and circumferential all reference the common central axis of the screw shaft and bore when the screw shaft extends through the bore unless specifically stated otherwise.

In an embodiment of the above embodiment the ball screw further comprises a plurality of ball bearings. The load circuit is adapted to allow a plurality of those ball bearings to travel around the load circuit.

In an embodiment of any of the above embodiments the external thread is a helical thread. In some embodiments the external thread is formed so as to create a groove, channel or raceway that is so configured that the ball bearings can roll along the groove between adjacent thread crests. In some embodiments the cross section of the groove is approximately semi-circular. In other embodiments, other known thread profiles may be used and such other thread profiles fall within the scope of the present disclosure.

In an embodiment of any of the above embodiments the or each internal thread is a helical thread with the same pitch as the external thread. The radially inner diameter of the internal thread (the distance between the crests of the internal thread) and the radially outer diameter of the external thread (the distance between the crests of the external thread), are approximately the same. In some embodiments the internal thread is configured so as to create a groove, channel or raceway that is dimensioned so that the ball bearings can roll along the groove between adjacent crests. In some embodiments the cross section of the groove is approximately semi-circular. In other embodiments, other known thread profiles may be used and such other thread profiles fall within the scope of the present disclosure.

In an embodiment of any of the above embodiments the load circuit comprises at least a part of a closed channel or raceway formed by the external thread and an internal thread, and a ball bearing return channel.

In some embodiments the ball bearing return channel can be wholly defined by the body of the ball nut. In other embodiments at least part of the ball bearing return channel can be external to the body of the ball nut, or partially defined by the body of the ball nut and partially external to the ball nut.

The closed channel or raceway formed by the external thread and internal thread is formed and maintained by the ball bearings in the load circuit holding the external and internal threads in register with each other. Alternatively expressed, the open channel or raceway formed by the external and internal threads face each other to form the closed channel or raceway. They do not stop facing each other because the ball bearings prevent the threads from not facing each other or moving out of register with each other. Because the open channel or raceway cannot not face each other, rotation of one of the screw shaft and the ball nut relative to the other about their common longitudinal axis causes one of the screw shaft and ball nut to rotate and move axially relative to the other as the ball bearings travel along the closed channel or raceway formed between the external thread and an internal thread.

In an embodiment of any of the above embodiments the ball bearing return channel has a first and second end each of which opens into the closed channel or raceway formed by the external thread and internal thread. In some embodiments the first and second ends each include one or more deflectors that guide the ball bearings as they move between the closed channel or raceway and the ball bearing return channel.

In order to increase the service life and efficiency of known ball screws the or each load circuit of the ball screw is/are greased or otherwise lubricated, for example by the use of oil or a similar substance. In known ball screws there are generally one or more so called dead volumes in the ball screw. Dead volumes are typically found in any parts/volumes of the load circuit or in volumes in lubricant communication with the load circuit, that do not have ball bearings moving through them. Lubricant located in the dead volumes offers little lubrication to the ball screw and the ball bearings in particular. In the context of the present disclosure a number of elements in lubricant communication with each other are so arranged that lubricant can flow between those elements.

The volume or capacity of the or each load circuit to hold lubricant is typically small and as a result known load circuits are found to need to be re-lubricated on a regular basis.

An aim of the present disclosure is to provide a re-circulating lubricant flow path within the ball screw of the present disclosure in order to limit or avoid dead volumes. An advantage of achieving this aim is to improve the lubrication of the ball screw and the ball bearings within the ball screw.

In an embodiment of any of the above embodiments the lubricant channel has a first and a second lubricant channel mouth. Extending between the first and second lubricant channel mouths is a lubricant flow path. The lubricant flow path does not include any of the closed channel or raceway formed by the external and internal threads. The lubricant flow path is, in some embodiments, a channel or conduit that is wholly defined by the body of the ball nut. In some embodiments the flow path is a channel or conduit that is partially defined by the body of the ball nut and partially by one or more pipes, tubes or conduits that are not formed from the body of the ball nut. In some embodiments the flow path is a channel or conduit that is wholly defined by one or more pipes, tubes or conduits that are not formed from the body of the ball nut.

In an embodiment of any of the above embodiments one or both of the lubricant channel ends include one or more scoops or deflectors that cause lubricant approaching the lubricant channel end to be deflected into the lubricant channel.

It has been found that the rotation of one of the screw shaft and the ball nut relative to the other about their common longitudinal axis causes the ball bearings in the load circuits to transport lubricant along at least the closed channel or raceway formed between the external thread and internal thread. It has also been found that at least a portion of that lubricant is not carried into the ball return channel when the ball bearings enter that return channel. It has been found that non-returned lubricant is, in particular, deposited in or impelled towards a dead volume that is, relative to the direction of travel of the ball bearings, further along the closed channel or raceway formed by the external thread and an internal thread than the mouth of the ball return channel.

In a ball screw of the present disclosure, a channel mouth of the lubricant channel is further along the closed channel or raceway formed between the external thread and an internal thread than the proximal end of first part of the load circuit. Thus lubricant deposited from the ball bearings adjacent to the proximal end of the first part of the load circuit and further along the closed channel or raceway than the ball bearings travel causes lubricant to be pushed into the lubricant channel through a lubricant channel end and then along the lubricant flow path until the lubricant exits the lubricant flow path at the other lubricant channel end. The lubricant may then again travel along the first part if the load circuit. This flow of lubricant assists in lubricating the load circuit.

In an embodiment of any of the above embodiments the ball screw further comprises a lubricant chamber. The lubricant chamber is formed in the body of the ball nut and is co-axial with the bore. One end of the lubricant chamber is adjacent to one end of the first part of the load circuit, and the lubricant chamber extends axially away from both ends of the first part of the load circuit. The shuttle extends into the lubricant chamber and the shuttle is in sliding contact with the surface of the ball nut that defines the radially outer surface of the lubricant chamber.

In an embodiment of any of the above embodiments the lubricant chamber extends around part of the longitudinal surface of the bore in the circumferential direction. In such embodiments the lubricant chamber does not extend around the whole of the bore.

In an embodiment of any of the above embodiments the lubricant chamber extends wholly around the bore in a circumferential direction.

In an embodiment of any of the above embodiments the chamber ends of the lubricant chamber are at least partially connected by a circumferentially extending surface. The circumferentially extending surface has the same radial distance from the central axis across the whole of the circumferential surface.

In an embodiment of any of the above embodiments the chamber end walls of the lubricant chamber are radially extending. In an alternative embodiment the chamber end walls of the lubricant chamber are orientated in a converging fashion with the end walls becoming closer with increasing radial distance from the central axis.

In an embodiment of any of the above embodiments the lubricant chamber is a volume that has the shape of a cylinder when the screw shaft is not extending through the bore of the ball nut, and the shape of the axially extending wall is of tubular or circular cross-section. The lubricant chamber has the shape of a ring toroid when the screw shaft is extending through the bore of the ball nut. A ring toroid has the shape that is described or formed when a rectangle is rotated around an axis that is parallel to one of the edges of that rectangle and outside of that rectangle.

In an embodiment of any of the above embodiments, the lubricant channel comprises a means to prevent flow of lubricant in one direction along the lubricant channel.

In some embodiments of the above embodiment, the means to prevent flow of lubricant in one direction is a check valve or a similar mechanical arrangement.

In an embodiment of any of the above embodiments the lubricant channel comprises a means to prevent flow of lubricant, for example a check valve, from the second channel end to the first channel end of that lubricant channel. The prevention of flow of lubricant along the lubricant flow path in one direction promotes the flow of the lubricant along the load circuit rather than potentially allowing the lubricant to repeatedly move backwards and forwards along the lubricant channel.

In an embodiment of any of the above embodiments the ball nut further comprises a lubricant reservoir, and the lubricant reservoir and the lubricant channel are so configured that the lubricant channel intersects with and is in communication with the lubricant reservoir. The lubricant reservoir increases the volume of lubricant that may be placed in the ball screw and thus decreases the frequency of needing to refill the lubricant in the ball screw.

In an embodiment of any of the above embodiments the ball screw further comprises at least one ball nut seal, each ball nut seal extends between the body of the ball nut and the screw shaft, and one ball nut seal is located adjacent the end of the first part of the load circuit that is remote from the lubricant chamber.

In an embodiment of the above embodiment, at least one ball nut seal is retained in fixed position relative to the ball nut body.

In an embodiment of the above embodiment, at least one ball nut seal is retained in an axially floating relationship to the body.

The ball nut seal is in sealing contact with both the screw shaft and the ball nut. The ball nut seal thus limits the distance along the channel or raceway formed between the external thread and the longitudinal surface of the bore that the lubricant can travel. Because a first lubricant channel end of the lubricant channel is between the ball nut seal and the load circuit the volume that is between the ball nut seal and the load circuit is, either wholly or in part no longer a dead volume. This results in lubricant pushed into the space between the ball nut seal and the load circuit not becoming dead lubricant. It is instead pushed into the lubricant channel via a lubricant channel end of the lubricant channel.

In an embodiment of any of the above embodiments the ball screw further comprises a shuttle, in which the shuttle is engaged with the longitudinally extending surface of the screw shaft, and the shuttle is in sliding contact with the ball nut. The sliding contact between the shuttle and the ball nut is the shuttle in contact with a longitudinally extending face or surface of the ball nut.

In an embodiment of any of the above embodiments the shuttle is engaged with the longitudinally extending surface of the screw shaft via an internal thread that engages with the external thread on the screw shaft.

In an embodiment of any of the above embodiments the engagement between the shuttle and the screw shaft is a sliding engagement, and that engagement is such that the force required to cause the shuttle to slide relative to the screw shaft is higher than the force required to cause the shuttle to slide relative to the ball nut and cause the flow of the lubricant around a lubricant circuit.

In an embodiment of any of the above embodiments the engagement between the shuttle and the screw shaft is a sliding engagement, and that engagement is such that when the shuttle is prevented from moving relative to the ball nut, because an engagement between the shuttle and ball nut is preventing movement, the force required to cause the shuttle to slide relative to the screw shaft is low enough that the screw shaft can continue to rotate relative to the ball nut.

In an embodiment of any of the above embodiments the engagement between the shuttle and the screw shaft is an engagement between the external thread and an internal thread associated with the shuttle, and the force required to cause the shuttle to travel along the external thread of the screw shaft is higher than the force required to cause the shuttle to slide relative to the ball nut and cause the flow of the lubricant around a lubricant circuit.

In an embodiment of any of the above embodiments where the ball screw comprises a lubricant chamber the shuttle extends into the lubricant chamber, the shuttle is in sliding contact with the one or both of the surface of the screw shaft and a surface partially defining the lubricant chamber, and the shuttle divides the lubricant chamber into first and second sub-chambers.

In an embodiment of any of the above embodiments the first and second sub-chambers are of variable volume dependent on the position of the shuttle between the first and second chamber ends. The first and second chamber ends are separated in an axial direction.

In an embodiment of any of the above embodiments where the ball screw comprises a lubricant chamber, the shuttle is so engaged with the screw shaft that when the shuttle is not in contact with a first or second end of the lubricant chamber, rotation around the central axis of one of the screw shaft and the ball nut relative to the other causes the shuttle to remain in a fixed position relative to the screw shaft and to move relative to the ball nut. This movement of the shuttle within the lubricant chamber has the result that one of the first and second sub-chambers increases in volume and the other decreases in volume.

In an embodiment of any of the above embodiments one of the sub-chambers is configured to allow lubricant to enter or exit the sub-chamber through an intersection with the external thread and the lubricant chamber, and the other of the sub-chambers is configured to allow lubricant to enter or exit the sub-chamber through an intersection with a lubricant channel end.

During axial movement of the shuttle relative to the ball nut in the above embodiment, any lubricant in the sub-chamber which is decreasing in volume will, unless the sub-chamber is full of lubricant, initially be deformed so as to conform to the changing dimensions of the sub-chamber. Once the sub-chamber which is decreasing in volume is full of lubricant, that lubricant will start to become pressurised and will be impelled, forced or pushed through the intersection of the external thread and the lubricant chamber or a lubricant channel end. That lubricant will move along the channel formed by the external thread and the longitudinal surface of the bore and towards the load circuit, or along the lubricant channel depending upon which direction the shuttle is moving relative to the ball nut.

In an alternative embodiment of any of the above embodiments one of the first and second sub-chambers is configured to allow lubricant to enter or exit the sub-chamber through an intersection with the external thread and the lubricant sub-chamber, and each of the first and second sub-chambers is configured to allow lubricant to enter or exit the sub-chamber through an intersection with a first or second lubricant channel end respectively.

In some embodiments where there are first or second lubricant channel ends those channel ends are the mouths of a pair of lubricant spurs. Those lubricant spurs are in fluid communication with each other and the lubricant channel at a junction.

In some embodiments the junction is so configured and arranged that it includes a means for blocking entry to one of the lubricant spurs when lubricant is entering the junction from the other of the lubricant spurs. In some embodiments the means is a shuttle ball that may move between a first position in which the shuttle ball closes the mouth of one of the lubricant spurs into junction to a second position in which the shuttle ball closes the mouth of the other of the lubricant spurs into junction.

During axial movement of the shuttle relative to the ball nut in the above embodiment, any lubricant in the sub-chamber which is decreasing in volume will, unless the sub-chamber is full of lubricant, initially be deformed so as to conform to the changing dimensions of the sub-chamber. Once the sub-chamber which is decreasing in volume is full of lubricant, that lubricant will start to become pressurised and will for one sub-chamber be impelled, forced or pushed through the intersection of the external thread and the lubricant chamber and a lubricant channel end. For the other sub-chamber, that lubricant will start to become pressurised and will be impelled, forced or pushed through the lubricant channel end. The lubricant will move along the channel formed by the external thread and the longitudinal surface of the bore and towards the load circuit, and/or along the lubricant channel depending upon which direction the shuttle is moving relative to the ball nut.

In an embodiment of any of the above embodiments the shuttle is so engaged with the screw shaft that rotation around the central axis of one of the screw shaft and the ball nut relative to the other causes the shuttle to remain in a fixed position relative to the ball nut and to move relative to the screw shaft when the shuttle is in interfering contact with either of the chamber ends. The shuttle is in interfering contact with a chamber end wall when the contact between the shuttle and the chamber end wall is such that the shuttle is caused to stop moving relative to the ball nut.

In this embodiment, when the shuttle moves to a position in which it is in interfering contact with a chamber end wall as a result of relative rotation between the screw shaft and the ball nut in one direction, continued relative rotation in that direction will cause the shuttle to start to move in an axial direction relative to the screw shaft. The shuttle will also rotate around the central axis.

When the direction of relative rotation between the screw shaft and the ball nut reverses the shuttle will move away from the end of the lubricant chamber that it was in interfering contact with and move longitudinally relative to the ball nut, and remain in a fixed position relative to the screw shaft. That movement will continue until the shuttle comes into interfering contact with the other chamber end wall. The shuttle will then start to move in an axial direction relative to the screw shaft if that relative rotation continues. The shuttle will also rotate around the central axis.

In addition to the above advantage, an additional advantage is that when the shuttle and ball bearings are pushing the lubricant through at least one part of the load circuit, the lubricant that is pushed through the lubricant channel is delivered into the sub-chamber of the lubricant chamber which is at that time increasing in volume.

In some embodiments of any of the above embodiments where there is a one way flow control means in the lubricant channel, that control means allows lubricant to flow from one lubricant channel end to the other lubricant channel end, but not to flow in the other direction. That flow control means prevents the shuttle pushing lubricant into one of the lubricant channel ends.

In some embodiments of the above embodiment, the one way flow control means is a check valve or a similar mechanical arrangement.

In an embodiment of any of the above embodiments a portion of the lubricant channel extends through the shuttle.

In an embodiment of the above embodiment the portion of the lubricant channel that extends through the shuttle includes a means for limiting the flow of lubricant through the lubricant channel to flow in one direction only.

In some embodiments of the above embodiment, the means for limiting the flow of lubricant is a check valve or a similar mechanical arrangement.

In an embodiment of any of the above embodiments the lubricant reservoir is configured to be elastically deformable to increase in volume if the lubricant in the reservoir has a fluid pressure in excess of a predetermined fluid pressure.

In an embodiment of the above embodiment the lubricant reservoir includes a non-zero number of walls in a fixed spatial relationship to each other and at least one mobile wall that is capable of movement relative to the fixed walls.

In some embodiments at least one mobile wall is formed from an elastically deformable material. In some embodiments at least one mobile wall is formed from a rigid material and supported in position relative to the fixed walls by at least one elastically deformable element.

In some embodiments at least one elastically deformable element is a spring, for example a compression spring.

In an embodiment of any of the above embodiments the shuttle and/or lubricant chamber is so configured that when a part of the shuttle comes into interfering contact with a stop or part of a chamber end wall the remainder of the shuttle is spaced from the end wall the shuttle had been moving towards.

In an embodiment of any of the above embodiments one of the chamber end walls is configured to direct lubricant towards the intersection of that end wall and the external thread.

In an embodiment of any of the above embodiments, there are a plurality of load circuits associated with an external thread on the screw shaft.

In an embodiment of any of the above embodiments, there are a plurality of lubricant chambers and there are a plurality of load circuits associated with an external thread on the screw shaft.

In an embodiment of any of the above embodiments there are a plurality of external threads on the screw shaft, and a number of internal threads suitable for the number of external threads. In this embodiment the plurality of external threads are parallel to each other, and the features of any of the above described embodiments described above in connection with a single external thread may be present in connection with alone or more of the plurality of external threads.

In an embodiment of any of the above embodiments the ball screw further comprises a lubricant, and the lubricant is an oil or a grease.

BRIEF DESCRIPTION OF THE FIGURES

The present disclosure will be further described and explained by way of example with reference to the accompanying drawings in which.

DETAILED DESCRIPTION

Figure 1:
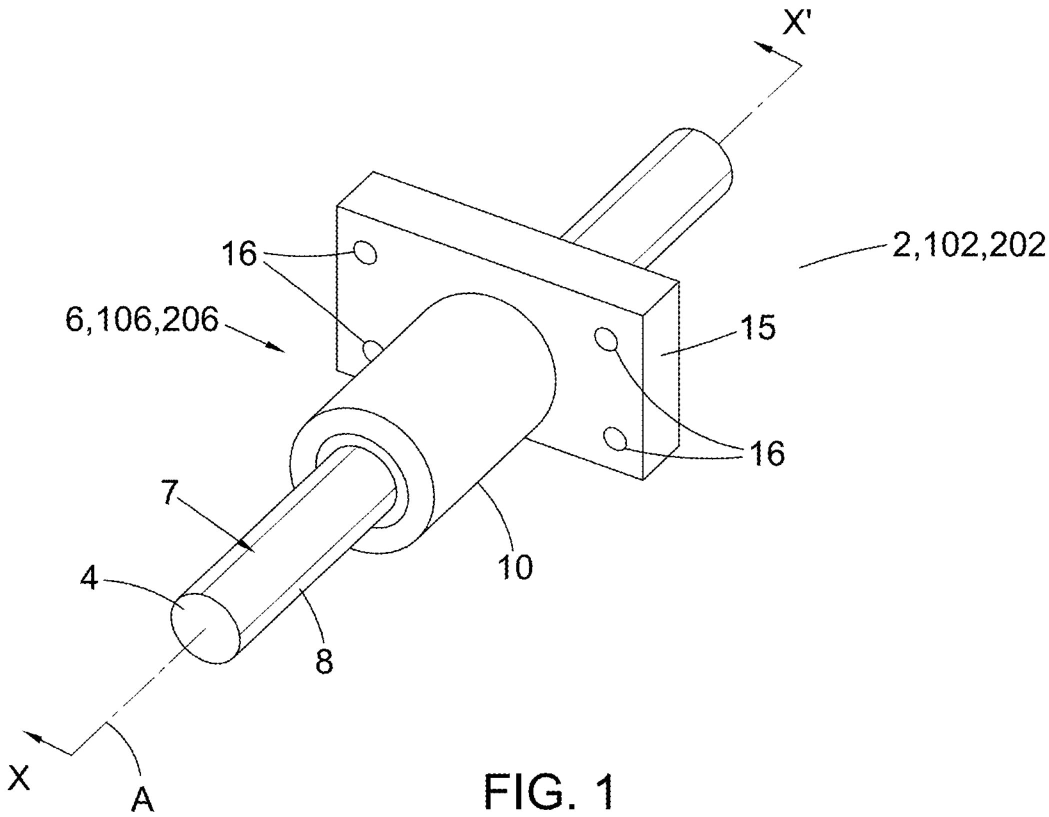
FIG. 1 shows a schematic perspective view of an embodiment of a ball screw according to the present disclosure.

In the following discussions of the accompanying drawings, where the same element is present in a more than one embodiment the same reference numeral is used for that element throughout, where there are similar elements similar reference numerals (the same numeral plus a multiple of 100) are used.

With reference to FIG. 1 an external view of an embodiment of a ball screw 2 according to the present disclosure is shown. The ball screw 2 includes a screw shaft 4, a ball nut 6, 106, 206, and a load circuit 23 (shown in FIGS. 3 to 8) which is formed from a first part 23A and a second part 23B.

The ball nut 6, 106, 206 includes a body 10, 110, 210, a bore 14, 114 (shown in FIGS. 3 and 4, and 5 to 8 respectively), a flange 15, and the second part 23B of the load circuit 23. The bore 14, 114 is circular or approximately circular in cross section in a plane perpendicular to the central axis of the bore. The flange 15 is adapted to be connected to other structures (not shown) using bolt holes 16. The flange 15 is not described or labelled in the below described embodiments.

Figure 2:
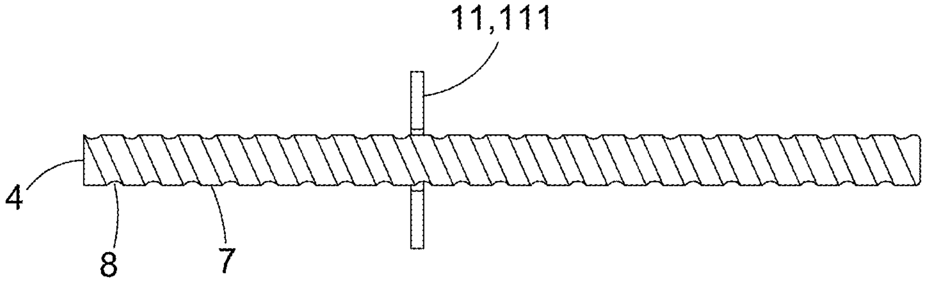
FIG. 2 shows detail of the screw shaft of FIG. 1.

With reference to FIGS. 1 and 2, the screw shaft 4, is a cylindrical shaft with a central axis A, and a longitudinally extending surface 7 which includes an external helical screw thread 8. The external thread 8 extends the whole length of the screw shaft 4. A part of the external thread 8 forms a part of the first part 23A of the load circuit 23. The axial position of the first part 23A of the load circuit 23 on the screw shaft 4 will vary and depend on the axial position of the ball nut 6, 106, 206 on the screw shaft 4. A shuttle 11, 111 is engaged with the external thread 8 of the screw shaft 4.

Figure 3:
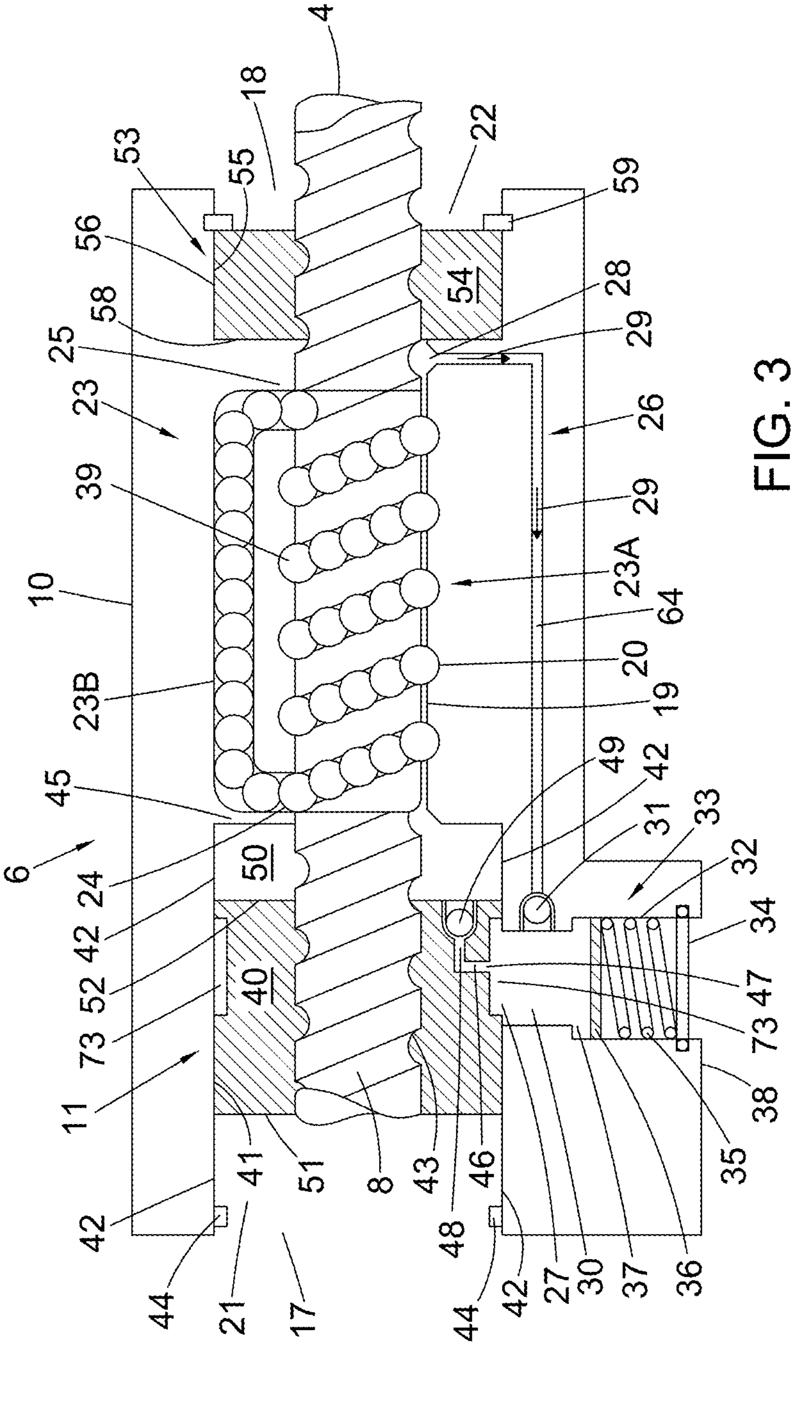
FIG. 3 shows a schematic sectional view of a part of a first embodiment of a ball screw of FIG. 1 along the section line X-X'.
Figure 4:
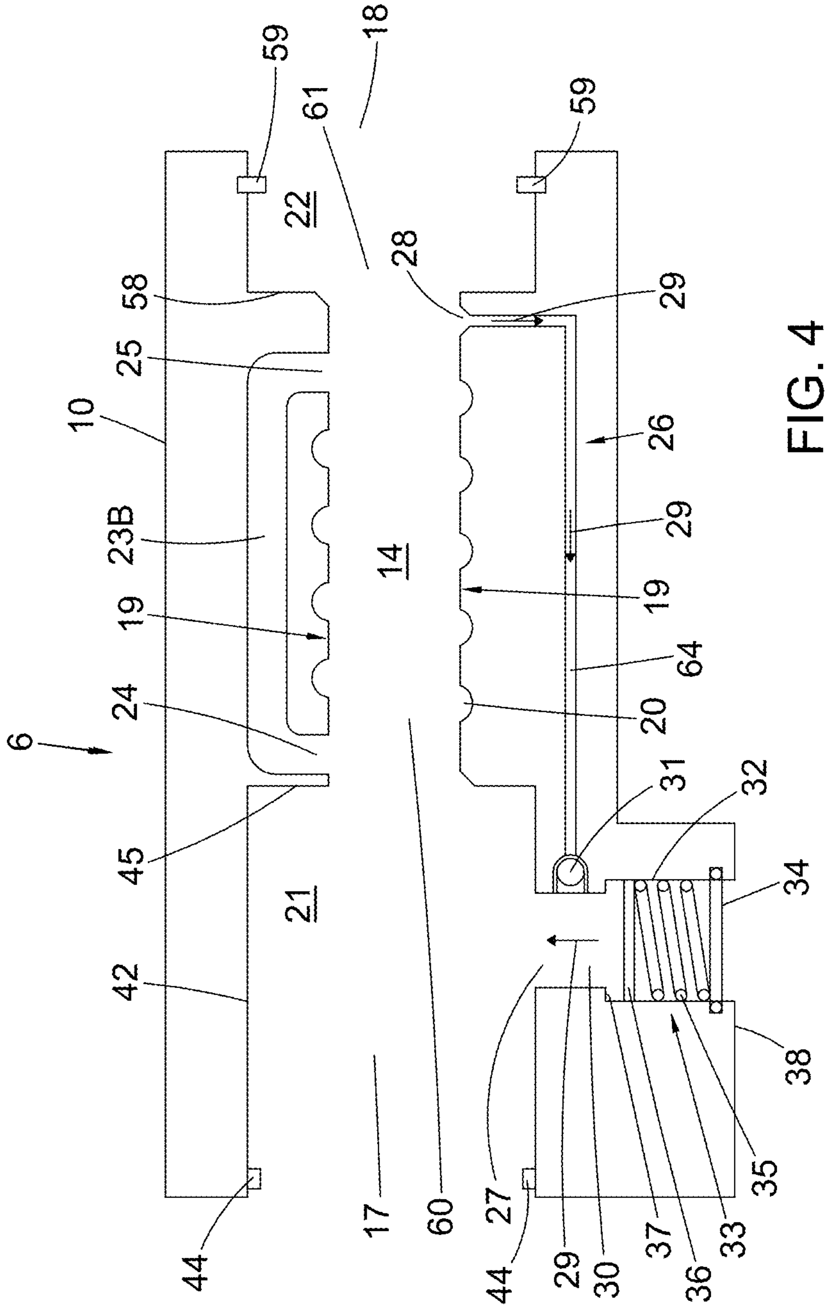
FIG. 4 shows a schematic sectional view of the body of the ball nut of FIG. 3 along the section line X-X'.

With reference to FIGS. 1, 3 and 4, the bore 14 extends through the body 10 of the ball nut 6 between a first end 17 and a second end 18. The first and second ends 17, 18 of the bore 14 form mouths in the surface of the body 10.

The bore 14 is partially defined by a longitudinally or axially extending surface 19. The surface 19 forms a tube of approximately circular cross section. The surface 19 is configured to form an internal thread 20 which has the same pitch as the external thread 8 of the screw shaft 4.

Extending into the body 10 from the first end 17 of the bore 14 to a first end 60 of the surface 19 is a cylindrical recess 21. The recess 21 is co-axial with the tube of surface 19.

Extending into the body 10 from the second end 18 of the bore 14 to a second end 61 of the surface 19 is a cylindrical recess 22. The recess 22 is co-axial with the tube of surface 19.

Extending through a part of the body 10 from a first load circuit mouth 24 to a second load circuit mouth 25 is the second part 23B of the load circuit 23. The portion of the surface 19 extending between the axial positions of the first and second load circuit mouths 24, 25 forms part of the first part 23A of the load circuit 23.

Also extending through the body 10 is a lubricant channel 26 which extends between a first lubricant channel end 27 and a second lubricant channel end 28.

The lubricant channel 26 includes a lubricant conduit 64 and a lubricant reservoir 30. The lubricant reservoir 30 has an open end that forms the first lubricant channel end 27.

The lubricant conduit 64 and a lubricant reservoir 30 define a flow path 29 along which lubricant can flow.

At the intersection of the channel 26 and the lubricant reservoir 30 there is a means to prevent flow of lubricant in one direction along the lubricant channel in the form of a one way flow control 31. The one way flow control 31 in the form of a check valve allows lubricant (not shown) to enter the lubricant reservoir 30 from the channel 26, and prevents lubricant from exiting the lubricant reservoir 30 into the channel 26. As a result, the flow path 29 extends along the lubricant conduit 64 from the second lubricant channel end 28 to the intersection with the lubricant reservoir 30.

The lubricant reservoir 30 is formed from a second bore 32 that extends from a surface 38 of the body 10 to the recess 21. The second bore 32 includes an internal shoulder 37 that narrows the bore 32 in the direction from the surface 38 to the recess 21.

The second bore 32 is reversibly closed by a closure element 33. The closure element 33 is comprised of a cap 34 on which a biasing element 35 is mounted. The biasing element 35 is configured support a plunger 36 on the end of the biasing element 35 remote from the cap 34. The biasing element 35 is configured to bias the plunger 36 toward the recess 21, and the shoulder 37 prevents the biasing element from biasing the plunger 36 closer to the recess 21 than the shoulder 37. The plunger 36 is in a sliding sealing engagement with the surface defining the portion of the second bore 32 extending between the cap 34 and the shoulder 37.

The lubricant reservoir 30 provide a reserve of lubricant that will compensate for lubricant lost from the parts of the ball screw 2 of the present disclosure that require lubrication when the ball screw 2 is in use. The loss of lubricant is typically the result of imperfect sealing between elements of the ball screw 2. The biasing of the plunger 36 by the biasing element 35 has the effect that lubricant in the lubricant reservoir 30 is used to replace the lubricant lost from the parts of the ball screw 2 that require lubrication as it is lost.

When the ball nut 6 is engaged with the screw shaft 4 and the screw shaft 4 extends along the bore 14 with the external thread 8 of the screw shaft 4 aligned with the internal thread 20 of the ball nut 6. The portion of the external thread 8 and the internal thread 20 that is positioned between the first and second load surface mouths 24, 25 forms the first part 23A of the load circuit 23.

The alignment of the external thread 8 and the internal thread 20 is maintained by a plurality of ball bearings 39 located in the first part of the load circuit 23A (for clarity, only one ball bearing 39 is labelled). The number of ball bearings in the load circuit is determined by the maximum number of ball bearings 39 that will fit in the load circuit 23 without jamming.

Located in the recess 21 is the shuttle 11.

The shuttle 11 includes a shuttle body 40. The shuttle body 40 includes a radially outer face 41 which is adapted to be in a sliding sealing engagement with a surface 42 which partially defines the recess 21.

The shuttle body 40 also includes a radially inner surface 43 which is adapted to engage with the external thread 8 of the screw shaft 4. That engagement is a sealing engagement that prevents or minimises the flow of lubricant between the shuttle body 40 and screw shaft 4.

The shuttle 11 is adapted to move axially between a position where a part of the first end face 51 of the shuttle body 40 abuts a stop element 44, and a position in which a second end face 52 of the shuttle body 40 abuts an end face 45 of the recess 21. When the end face 52 of the shuttle body is not abutting the end face 45 a lubricant chamber 50 is formed. The lubricant chamber 50 is approximately a ring toroid in shape and is defined by at least a part of the surface 42 and end face 45 of the recess 21, the external thread 8 of the screw shaft 4, and the second end face 52 of the shuttle body 40.

Extending radially inwardly into the shuttle body 40 from the radially outer surface 41 is a circumferential lubricant grove 73. The lubricant groove 73 is so positioned that, irrespective of the axial position of the shuttle 11 between the stop element 44 and the end face 45 of the recess 21, a part of the mouth of the lubricant groove 73 in the radially outer surface 41 overlies the first lubricant channel end 27.

The shuttle body 40 further includes a lubricant conduit 46 which extends between a first lubricant conduit mouth 47 and a second lubricant conduit mouth 48. The first lubricant conduit mouth 47 opens into the lubricant groove 73. This positioning of the first lubricant conduit mouth 47 has the effect that the first lubricant conduit mouth 47 is always in lubricant communication with the first lubricant channel end 27.

The axial length of the shuttle body 40 (the distance between first end face 51 and second end face 52 of the shuttle body 40) is such that the radially outer face 41 of the shuttle body 40 is always in sealing contact with at least part of the surface 42 that extends axially between the stop element 44 and the first lubricant channel end 27. This has the result that the shuttle body 40 acts as a seal element in the recess 21.

The second lubricant conduit mouth 48 opens in the second end face 52 of the shuttle body 40. The second lubricant conduit mouth 48 includes a one way flow control 49 which is configured to allow lubricant (not shown) to enter the lubricant chamber 50 from the lubricant conduit 46, and not allow lubricant to exit the lubricant chamber 50 into the lubricant conduit 46.

Located in the recess 22 is a seal element 53.

The seal element 53 includes a seal element body 54. The seal element body 54 includes a radially outer face 55 which is adapted to be in a sealing engagement with a surface 56 which defines the recess 22.

The seal element body 54 also includes a radially inner surface 57 which is configured as an internal thread adapted to threadingly engage with the external thread 8 of the screw shaft 4. That threading engagement is a sealing engagement that prevents or minimises the flow of lubricant between the seal element body 54 and screw shaft 4.

The seal element 53 is located axially between and in contact with an end face 58 of the recess 22 and a stop element 59. In other embodiments alternative ways of retaining the seal element 53 in position are possible.

When the ball screw 2 is in use, the screw shaft 4 rotates about its longitudinal axis A and the ball nut 6 is prevented by means not shown from moving around the axis A. The ball bearings 39 in the load circuit 23 cause the external thread 8 of the screw shaft 4 and the internal thread 20 of the ball nut 6 to engage with each other and cause the body 10 of the ball nut 6 to move in an axial direction relative to the screw shaft 4.

The shuttle 11 is prevented from rotating around the axis A and as a result the engagement between the inner surface 43 of the shuttle 11 and the external thread 8 causes the shuttle 11 to move axially until it is stopped from further movement when the shuttle abuts the stop element 44 or end wall 45 of the recess 21.

To prepare the ball screw 2 for use, the screw shaft 4 is rotated so that the shuttle 11 is not abutting the end face 45 of the recess 21. Lubricant (not shown) is then introduced into the lubricant reservoir 30 through a grease nipple (not shown) until it is full. When the lubricant is introduced into the reservoir it is introduced under pressure and the lubricant pushed against the plunger. As a result, the biasing element 35 is compressed. The lubricant is prevented from leaving the lubricant chamber and flowing into the lubricant conduit 64 by the one way flow control 31 with the result that lubricant exits the lubricant reservoir 30 and enters the lubricant conduit 46 and the lubricant chamber 50 thereafter.

Once the lubricant chamber 50 is full or sufficiently full of lubricant, rotation of the screw shaft 4 in the direction that causes the shuttle 11 to move towards the end wall 45 of the recess 21 will cause the lubricant to fill the lubricant chamber 50 if the chamber is not already full of lubricant (because the lubricant chamber 50 is decreasing in volume) and the internal pressure of the lubricant then to rise. The one way flow control 49 prevents the lubricant flowing into the lubricant conduit 46 and, as a result, the lubricant flows along the channel formed between the external thread 8 of the screw shaft 4 and the internal thread 20 of the ball nut. The lubricant becomes associated or entrained with the ball bearings 39 and as they move along the load circuit 23 the ball bearings cause the lubricant to travel along that load circuit.

When the ball bearings 39 are travelling along the first part of the load circuit 23A in a left to right direction as shown in FIG. 3, that is towards the second end 18 of the bore 14, the ball bearings 39 enter the second part of the load circuit 23B through the second load circuit mouth 25. Some of the lubricant entrained with the ball bearings will enter the second part 23B of the load circuit and some of the lubricant will continue along the channel formed between the external thread 8 of the screw shaft 4 and the internal thread 20 of the ball nut until it encounters the seal element 54. The lubricant then flows or is impelled into the second mouth 28 of the lubricant channel 26 and follows the flow path 29 back into the lubricant reservoir 30.

If the lubricant entering the lubricant reservoir 30 is prevented from entering the lubricant chamber 50 because the internal pressure in the lubricant in the lubricant chamber 50 is higher than in the lubricant reservoir 30, for example when the shuttle 11 is moving towards the end wall 45 of the recess 21, the lubricant may cause the biasing element 35 to be compressed and the internal volume of the lubricant reservoir 30 between the plunger 36 and the first lubricant channel end 27 to increase. When the shuttle moves towards the stop element 44 the pressure in the lubricant in the lubricant chamber 50 will decrease and allow the biasing element 35 to impel lubricant into the lubricant chamber 50 until the plunger 36 abuts the shoulder 37.

Figure 5:
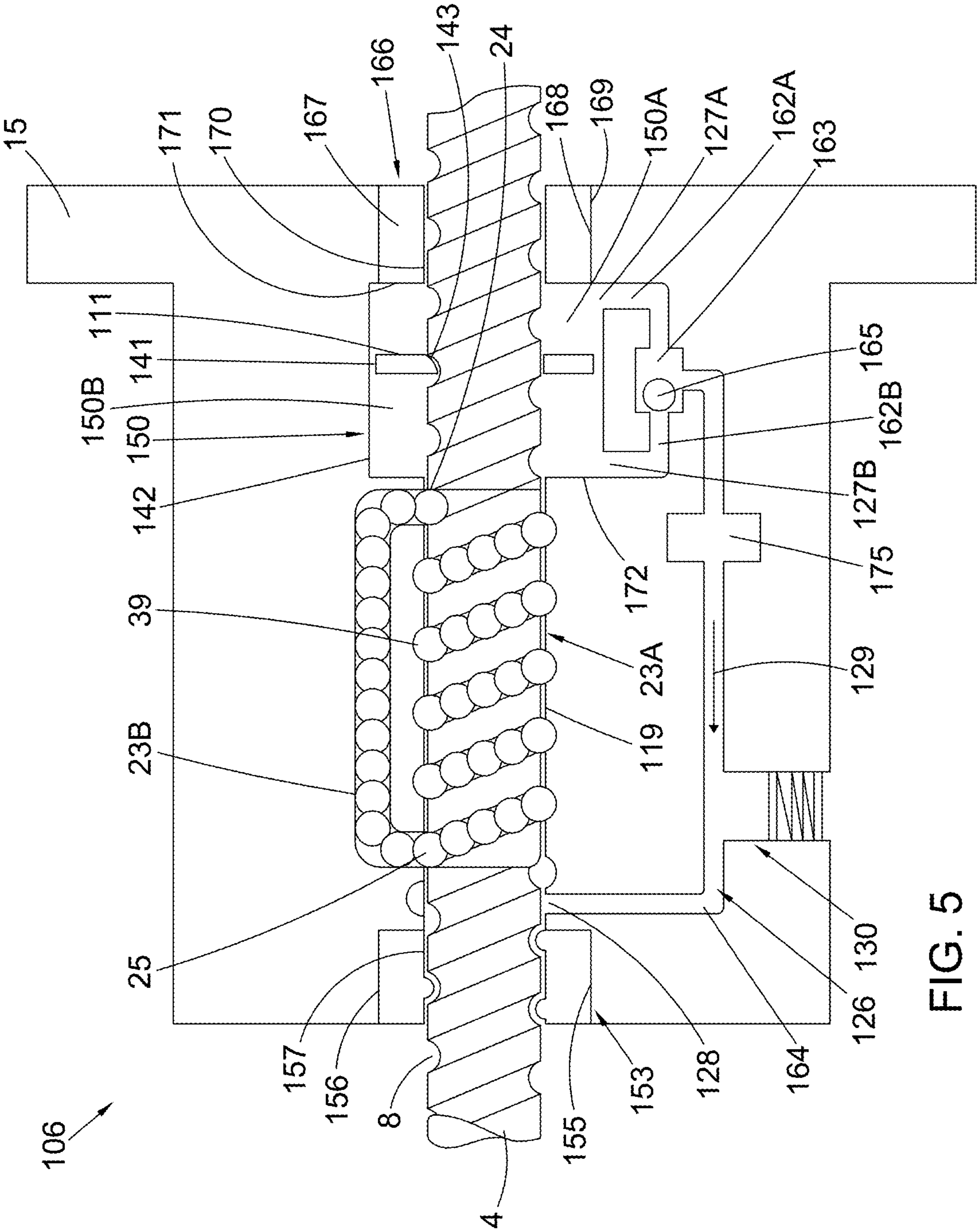
FIG. 5 shows a schematic sectional view of a part of a second embodiment of a ball screw of FIG. 1 along the section line X-X'.
Figure 6:
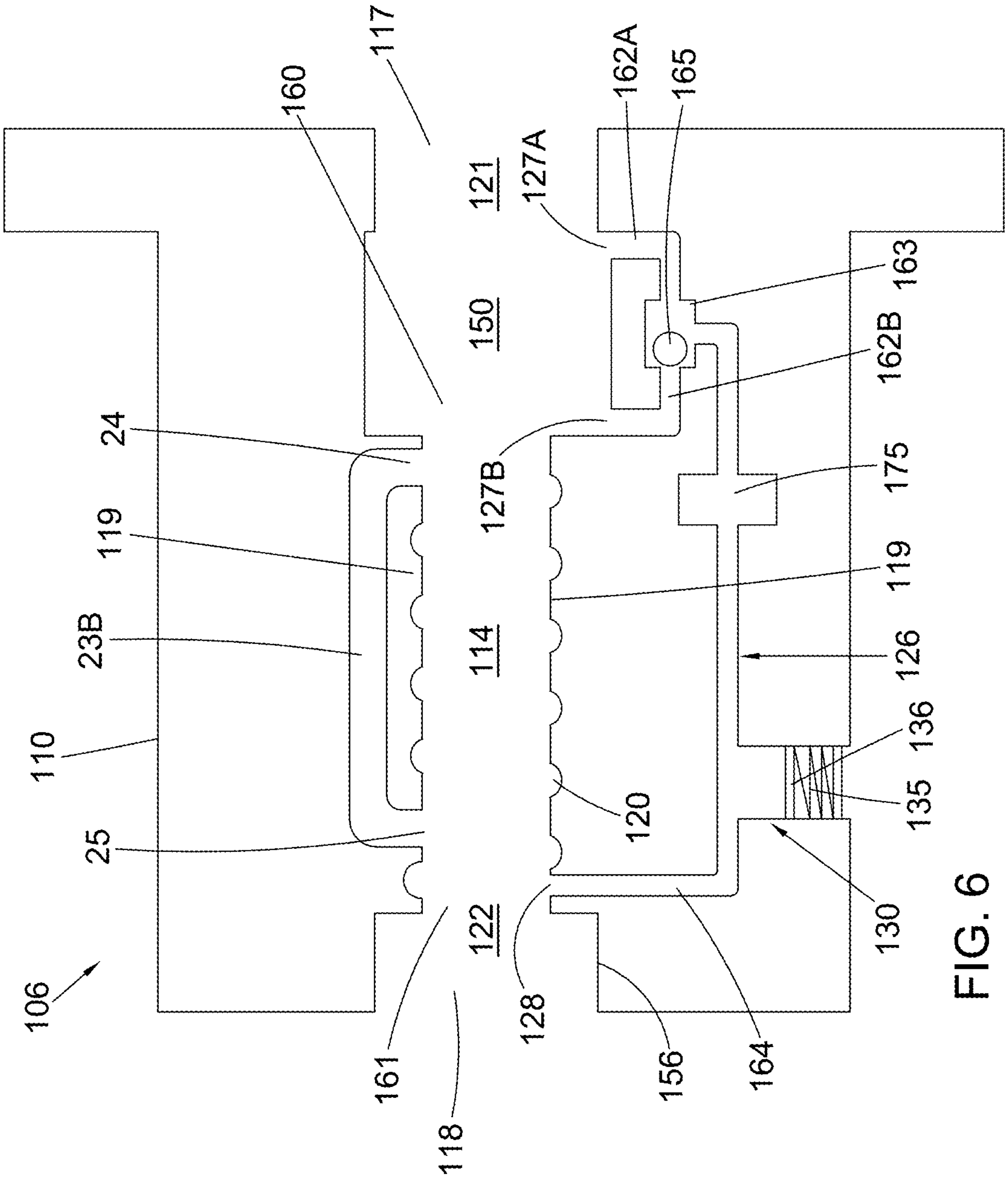
FIG. 6 shows a schematic sectional view of the body of the ball nut of FIG. 5 along the section line X-X'.

In a second embodiment of a ball screw 102 according to the present disclosure, and with reference to FIGS. 1, 5 and 6, the bore 114 extends through the body 110 of the ball nut 106 between a first end 117 and a second end 118. The first and second ends 117, 118 of the bore 114 form mouths in the surface of the body 110.

The bore 114 is partially defined by a longitudinally or axially extending surface 119. The surface 119 forms a tube of approximately circular cross section. The surface 119 is configured to form an internal thread 120 which has the same pitch as the external thread 8 of the screw shaft 4. The surface 119 extends in an axial direction from a first end 160 to a second end 161. The first end 160 of the surface is closer to the first end 117 of the bore than the second end 161 of the surface 119.

Extending into the body 110 from the first end 117 of the bore 114 is a cylindrical recess 121. The recess 121 is co-axial with the tube of surface 119.

Extending from the first end 160 of the surface to the recess 121 is a lubricant chamber 150. The lubricant chamber 150 is cylindrical and co-axial with the bore 114. The lubricant chamber 150 is so configured that lubricant may be introduced into the lubricant chamber 150 from outside the ball nut 106 via a grease nipple not shown.

Extending into the body 110 from the second end 118 of the bore 114 to the second end 161 of the surface 119 is a cylindrical recess 122. The recess 122 is co-axial with the bore 114.

Extending through a part of the body 110 from a first load circuit mouth 24 to a second load circuit mouth 25 is the second part 23B of the load circuit 23. The portion of the surface 119 extending between the axial positions of the first and second load circuit mouths 24, 25 forms part of the first part 23A of the load circuit 23.

Also extending through the body 110 is a lubricant channel 126 which extends between two lubricant channel ends 127A, 127B and a lubricant channel end 128. The lubricant channel 126 includes a first and second lubricant channel spur 162A, 162B. The first lubricant spur 162A extends between a junction 163 and the lubricant channel end 127A. The second lubricant spur 162B extends between the junction 163 and the lubricant channel end 127B. At the junction 163 the first and second lubricant spurs 162A, 162B and a lubricant conduit 164 intersect and are in communication with each other. Extending between the junction 163 and the lubricant channel end 128 is a lubricant conduit 164.

Located in the junction 163 is a means for preventing the flow of lubricant from one of the lubricant channel ends 127A, 127B to the other of the lubricant channel ends 127A, 127B. That means is a shuttle ball 165.

The lubricant conduit 164 includes a one way control means in the form of check valve 175 which allows the lubricant to flow along the lubricant conduit 164 only in the direction shown by arrow 129.

Optionally, the lubricant conduit 164 also includes a lubricant reservoir 130. The lubricant reservoir 130 has the same structure as the lubricant reservoir 30 described above in connection with FIGS. 3 and 4 with the exception that lubricant may enter and exit the lubricant reservoir 130 via the lubricant conduit 164. The lubricant reservoir 130 increases the volume of lubricant that may be placed in the ball nut 106 and serves to replace lubricant lost from the ball nut 106 as a result of the biasing of the lubricant into the lubricant conduit 164 as a result of the biasing means 135 and plunger 136.

Lubricant may be introduced into lubricant channel 126 via a grease nipple (not shown).

When the ball nut 106 is engaged with the screw shaft 4 and the screw shaft 4 extends along the bore 14 with the external thread 8 of the screw shaft 4 aligned with the internal thread 120 of the ball nut 106. The portion of the external thread 8 and the internal thread 120 that is positioned between the first and second load surface mouths 24, 25 forms the first part 23A of the load circuit 23.

The alignment of the external thread 8 and the internal thread 120 is maintained by a plurality of ball bearings 39 located in the first part of the load circuit 23A (for clarity, only one ball bearing 39 is labelled). The number of ball bearings in the load circuit is determined by the maximum number of ball bearings 39 that will fit in the load circuit 23 without jamming.

Located in the recess 121 is a seal element 166.

The seal element 166 includes a seal element body 167. The seal element body 167 includes a radially outer face 168 which is adapted to be in a fixed sealing engagement with a surface 169 which partially defines the recess 121.

The seal element body 167 also includes a radially inner surface 170 which is configured as an internal thread adapted to threadingly engage with the external thread 8 of the screw shaft 4. That threading engagement is a sealing engagement that prevents or minimises the flow of lubricant between the seal element body 167 and screw shaft 4.

The shuttle 111 includes a radially outer face 141 which is adapted to be in a sliding sealing engagement with a surface 142 which partially defines the lubricant chamber 150. The shuttle 111 also includes a radially inner surface 143 which is configured as an internal thread adapted to threadingly engage with the external thread 8 of the screw shaft 4. That threading engagement is a sealing engagement that prevents or minimises the flow of lubricant between the shuttle 111 and screw shaft 4.

The shuttle 111 is capable of moving axially between a position abutting a first axial end face 171 of the chamber 150 formed by the seal element 166 and a second axial end face 172 of the chamber 150 formed by a face of the body 110.

When the screw shaft 4 extends through the ball nut 106, the chamber 150 is approximately a ring toroid in shape and is defined by the first and second end faces 171, 172, the surface 142, and the external thread 8 of the screw shaft 4.

When the shuttle 111 is in a position where it is not abutting the first or second end faces 171, 172 the lubricant chamber 150 is divided by the shuttle 111 into first and second sub-chambers 150A, 150B.

Located in the recess 122 is a seal element 153.

The seal element 153 includes a radially outer face 155 which is adapted to be in a sealing engagement with a surface 156 which defines the recess 122.

The seal element 153 also includes a radially inner surface 157 which is configured as an internal thread adapted to threadingly engage with the external thread 8 of the screw shaft 4. That threading engagement is a sealing engagement that prevents or minimises the flow of lubricant between the seal element 153 and screw shaft 4.

When the ball screw 102 is in use, the screw shaft 4 rotates about its longitudinal axis A and the ball nut 106 is prevented by means not shown from moving around the axis A. The ball bearings 39 in the load circuit 23 cause the external thread 8 of the screw shaft 4 and the internal thread 120 of the ball nut 106 to engage with each other and cause the body 110 of the ball nut 106 to move in an axial direction.

The shuttle 111 and the screw shaft 4 are in a sliding engagement with each other, and the shuttle 111 and the surface 142 of the chamber 150 are also in sliding engagement with each other. The engagement between the shuttle 111 and the screw shaft 4 is such that the force required to cause the shuttle 111 to slide relative to the screw shaft 4 is higher than the force required to cause the shuttle 111 to slide relative to the surface 142/ball nut 106. The engagement between the shuttle 111 and the screw shaft 4 is such that the force required to cause the shuttle 111 to slide relative to the screw shaft 4 is higher than the force required to cause the flow of the lubricant along the lubricant channel 126 and load circuit 23.

The engagement between the shuttle 111 and the screw shaft 4 is also such that when the shuttle 111 is prevented from moving relative to the ball nut 106 because an engagement between the shuttle 111 and the axial end face 172 of the chamber 150 or the axial end face 171 of the seal element 166 is preventing movement, the force required to cause the shuttle 111 to slide relative to the screw shaft 4 is low enough that the screw shaft 4 can continue to rotate relative to the ball nut 106.

The lubricant sub-chambers 150A, 150B, lubricant channel 126, and load circuit 23 are filled with lubricant, or the lubricant levels maintained via a grease nipple (not shown).

The junction 163 and shuttle ball 165 are so arranged that when lubricant is caused to enter the junction 163 from the first lubricant spur 162A the shuttle ball 165 closes the mouth of the second load spur 162B into the junction 163. The junction 163 and shuttle ball 165 are also so arranged that when lubricant is caused to enter the junction 163 from the second lubricant spur 162B the shuttle ball 165 closes the mouth of the first load spur 162A into the junction 163.

In use of the ball screw 102, when the shuttle is caused to travel towards the axial end face 171 of the seal element 166 lubricant in the lubricant sub-chamber 150A is impelled to flow along the first lubricant spur 162A and into the junction 163 and as a result the shuttle ball closes the mouth of the second load spur 162B into the junction 163 and prevents that lubricant from flowing from the first lubricant sub-chamber 150A into the second lubricant sub-chamber 150B via the junction 163.

In addition to lubricant entering the first lubricant spur 162A, some lubricant may flow between the radially outer surface 141 of the shuttle 111 and the surface 142 of the of the chamber 150 because the contact between those surfaces is not fluid tight.

Because the mouth of the second load spur 162B into the junction 163 is closed by the shuttle ball 165 the movement of the shuttle 111 impels the lubricant in the first sub-chamber 150A into the lubricant conduit 164, to flow along the conduit in the direction shown by arrow 129, and into the channel formed between the external thread 8 of the screw shaft 4 and the internal thread 120 of the ball nut at the second lubricant channel end 128. The lubricant then becomes associated or entrained with the ball bearings 39 and as they move along the load circuit 23 the ball bearings cause the lubricant to travel along that load circuit.

When the ball bearings 39 are travelling along the first part of the load circuit 23A in a left to right direction as shown in FIG. 5, that is towards the first end 117 of the bore 114, the ball bearings 39 enter the second part of the load circuit 23B through the first load circuit mouth 24. Some of the lubricant entrained with the ball bearings 39 will enter the second part 23B of the load circuit and some of the lubricant will continue along the channel formed between the external thread 8 of the screw shaft 4 and the internal thread 120 of the ball nut until it enters the second lubricant sub-chamber 150B.

When the direction of travel of the shuttle 111 is reversed, that is the shuttle 111 moves towards the second axial end wall 172 of the lubricant chamber 150, the shuttle impels the lubricant in the sub-chamber 150B toward the channel formed between the external thread 8 of the screw shaft 4 and the internal thread 120 of the ball nut 106 and the second load spur 162B. Additionally, because the contact between the radially outer surface 141 of the shuttle 111 and the surface 142 of the of the chamber 150 is not fluid tight, and there is a resistance to the flow of the lubricant into channel formed between the external thread 8 of the screw shaft 4 and the internal thread 120 of the ball nut 106 and the second load spur 162B, lubricant is forced between the surfaces 141 and 142 and into the sub-chamber 150A.

The lubricant in the lubricant sub-chamber 150B is impelled to flow along the second lubricant spur 162B and into the junction 163 and as a result the shuttle ball closes the mouth of the first load spur 162A into the junction 163 and prevents that lubricant from flowing from the second lubricant sub-chamber 150B into the first lubricant sub-chamber 150A. Thereafter the lubricant impelled into the junction 163 follows the same path as described above when the shuttle is caused to travel towards the axial end face 171 of the seal element 166.

Figure 7:
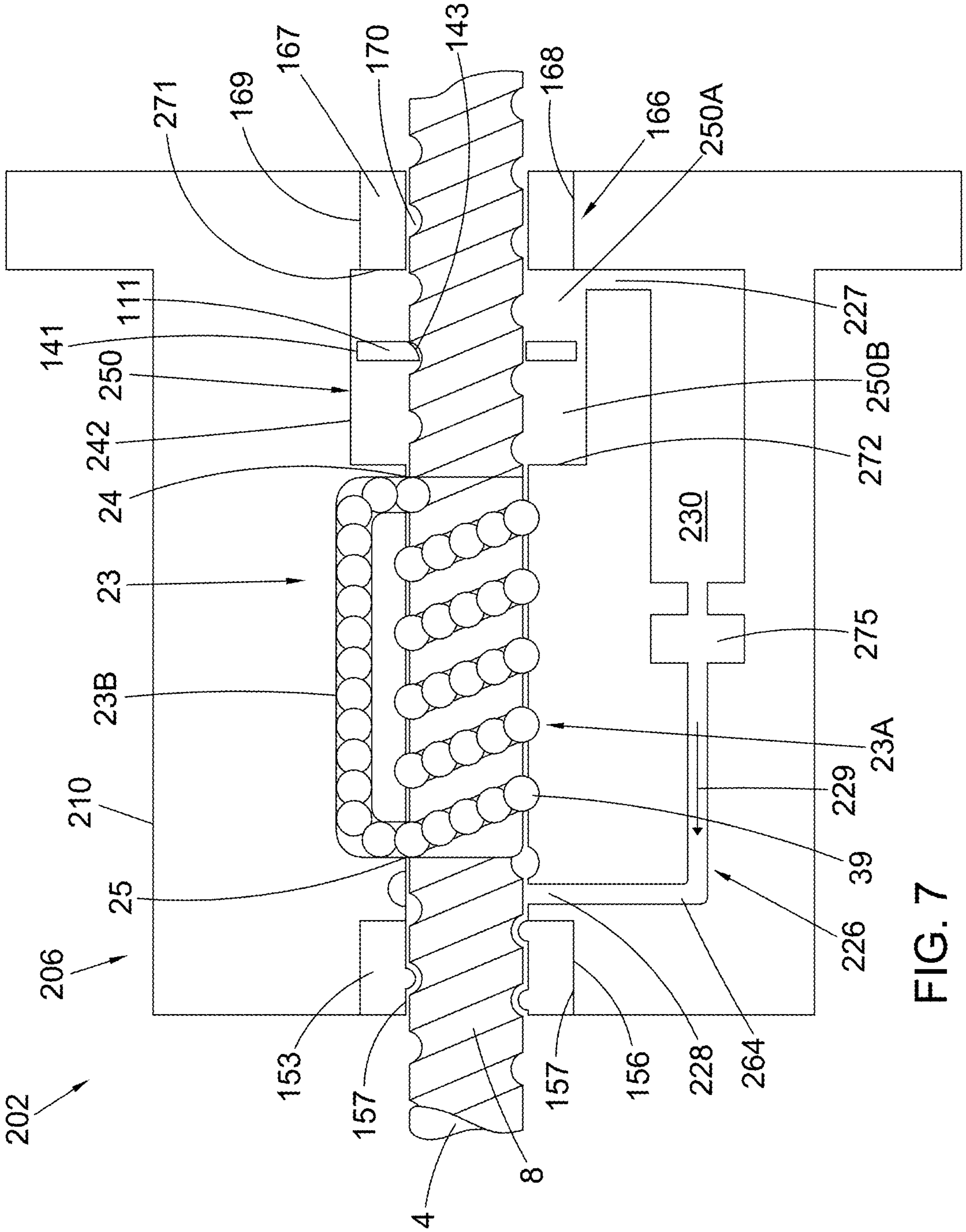
FIG. 7 shows a schematic sectional view of a part of a third embodiment of a ball screw of FIG. 1 along the section line X-X'.
Figure 8:
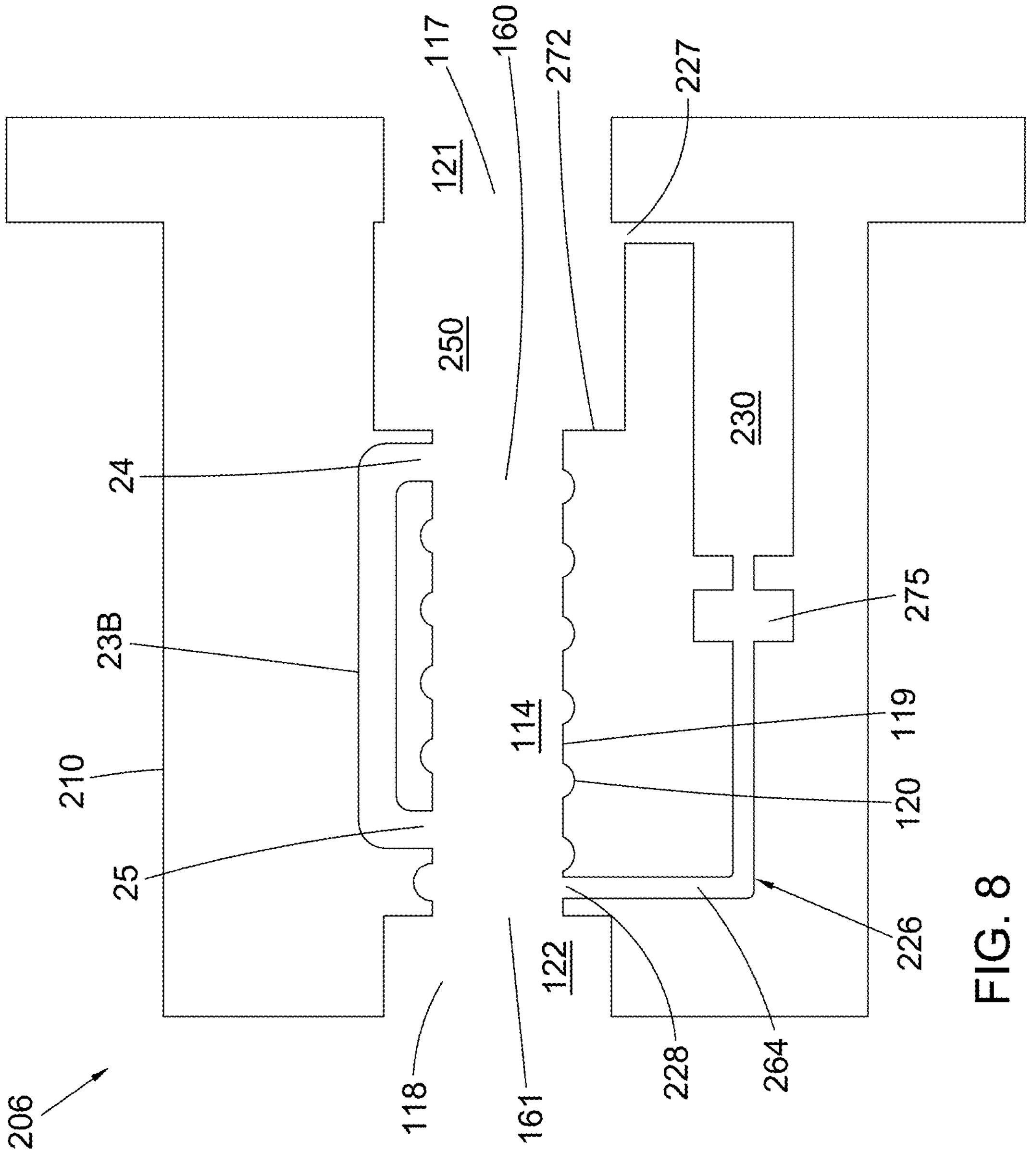
FIG. 8 shows a schematic sectional view of the body of the ball nut of FIG. 7 along the section line X-X'.

With reference to FIGS. 1, 7 and 8, the bore 114 extends through the body 210 of the ball nut 206 between a first end 117 and a second end 118. The first and second ends 117, 118 of the bore 114 form mouths in the surface of the body 210.

The bore 114 is partially defined by a longitudinally or axially extending surface 119. The surface 119 forms a tube of approximately circular cross section. The surface 119 is configured to form an internal thread 120 which has the same pitch as the external thread 8 of the screw shaft 4. The surface 119 extends in an axial direction from a first end 160 to a second end 161. The first end 160 of the surface is closer to the first end 117 of the bore than the second end 161 of the surface.

Extending into the body 210 from the first end 117 of the bore 114 is a cylindrical recess 121. The recess 121 is co-axial with the tube of surface 119.

Extending from the first end 160 of the surface to the recess 121 is a lubricant chamber 250. The lubricant chamber 250 is cylindrical and co-axial with the bore 114. The lubricant chamber 250 may be so configured that lubricant (not shown) can be introduced into the lubricant chamber 250 from outside the ball nut 206 via the recess 121.

Extending into the body 210 from the second end 118 of the bore 114 to the second end 161 of the surface 119 is a cylindrical recess 122. The recess 122 is co-axial with the bore 114.

Extending through a part of the body 110 from a first load circuit mouth 24 to a second load circuit mouth 25 is the second part 23B of the load circuit 23. The portion of the surface 119 extending between the axial positions of the first and second load circuit mouths 24, 25 forms part of the first part 23A of the load circuit 23.

Also extending through the body 110 is a lubricant channel 226 which extends between lubricant channel end 227 and a lubricant channel end 228. The lubricant channel 226 includes a lubricant reservoirs 230, and a one way flow control in the form of a check valve 275. The lubricant reservoir 230 increases the volume of lubricant that may be placed in the ball nut 206. The lubricant reservoir 230 may be of the same construction and benefits as the lubricant reservoir 30 of FIGS. 3 and 4.

Optionally, but not shown in FIGS. 7 and 8, the lubricant conduit 264 also includes a lubricant reservoir. The lubricant reservoir has the same structure and functions as the lubricant reservoir 130 described above in connection with FIGS. 5 and 6.

Lubricant is introduced into the lubricant reservoir from outside the ball nut 206 via a grease nipple (not shown).

The ball nut 206 is engaged with the screw shaft 4 and the screw shaft 4 extends along the bore 114 with the external thread 8 of the screw shaft 4 aligned with the internal thread 120 of the ball nut 206. The portion of the external thread 8 and the internal thread 120 that is positioned between the first and second load surface mouths 24, 25 forms the first part 23A of the load circuit 23.

The alignment of the external thread 8 and the internal thread 120 is maintained by a plurality of ball bearings 39 located in the first part of the load circuit 23A (for clarity, only one ball bearing 39 is labelled). The number of ball bearings in the load circuit is determined by the maximum number of ball bearings 39 that will fit in the load circuit 23 without jamming.

Located in the recess 121 is a seal element 166.

The seal element 166 includes a seal element body 167. The seal element body 167 includes a radially outer face 168 which is adapted to be in a fixed sealing engagement with a surface 169 which partially defines the recess 121.

The seal element body 167 also includes a radially inner surface 170 which is configured as an internal thread adapted to threadingly engage with the external thread 8 of the screw shaft 4. That threading engagement is a sealing engagement that prevents or minimises the flow of lubricant between the seal element body 167 and screw shaft 4.

The shuttle 111 includes a radially outer face 141 which is adapted to be in a sliding sealing engagement with a surface 242 which partially defines the lubricant chamber 250. The shuttle 111 also includes a radially inner surface 143 which is configured as an internal thread adapted to threadingly engage with the external thread 8 of the screw shaft 4. That threading engagement is a sealing engagement that prevents or minimises the flow of lubricant between the shuttle 111 and screw shaft 4.

The shuttle 111 and the screw shaft 4 are in a sliding engagement with each other, and the shuttle 111 and the surface 242 of the chamber 250 are also in sliding engagement with each other. The engagement between the shuttle 111 and the screw shaft 4 is such that the force required to cause the shuttle 111 to slide relative to the screw shaft 4 is higher than the force required to cause the shuttle 111 to slide relative to the surface 242/ball nut 206. The engagement between the shuttle 111 and the screw shaft 4 is such that the force required to cause the shuttle 111 to slide relative to the screw shaft 4 is higher than the force required to cause the flow of the lubricant along the lubricant channel 226 and load circuit 23.

The engagement between the shuttle 111 and the screw shaft 4 is also such that when the shuttle 111 is prevented from moving relative to the ball nut 206 because an engagement between the shuttle 111 and the axial end face 272 of the chamber 150 or the axial end face 271 of the seal element 166 is preventing movement, the force required to cause the shuttle 111 to slide relative to the screw shaft 4 is low enough that the screw shaft 4 can continue to rotate relative to the ball nut 206.

The shuttle 111 is capable of moving axially between a position abutting a first axial end face 271 of the chamber 250 formed by the seal element 166 and a second axial end face 272 of the chamber 250 formed by a face of the body 210.

When the screw shaft 4 extends through the ball nut 206, the chamber 250 is approximately a ring toroid in shape and is defined by the first and second end faces 271, 272, the surface 242, and the external thread 8 of the screw shaft 4.

When the shuttle 111 is in a position where it is not abutting the first or second end faces 271, 272 the lubricant chamber 250 is divided by the shuttle 111 into first and second sub-chambers 250A, 250B.

Located in the recess 122 is a seal element 153.

The seal element 153 includes a radially outer face 155 which is adapted to be in a sealing engagement with a surface 156 which defines the recess 122.

The seal element 153 also includes a radially inner surface 157 which is configured as an internal thread adapted to threadingly engage with the external thread 8 of the screw shaft 4. That threading engagement is a sealing engagement that prevents or minimises the flow of lubricant between the seal element 153 and screw shaft 4.

When the ball screw 202 is in use, the screw shaft 4 rotates about its longitudinal axis A and the ball nut 206 is prevented by means not shown from moving around the axis A. The ball bearings 39 in the load circuit 23 cause the external thread 8 of the screw shaft 4 and the internal thread 120 of the ball nut 206 to engage with each other and cause the body 210 of the ball nut 206 to move in an axial direction relative to the screw shaft 4.

When the ball screw 202 is in use, rotation of the screw shaft 4 in a first direction will cause the shuttle 111 to move towards the first end wall 271 which will cause the lubricant in the first lubricant sub-chamber 250A to flow into the lubricant channel 226 through the lubricant channel end 227 which opens into the sub-chamber 250A.

The lubricant is impelled to flow through the lubricant reservoir 230, and check valve 275, along the lubricant conduit 264 and into the channel formed between the external thread 8 of the screw shaft 4 and the internal thread 120 of the ball nut at the second lubricant channel end 228. The lubricant becomes associated or entrained with the ball bearings 39 and as they move along the load circuit 23 the ball bearings cause the lubricant to travel along that load circuit.

When the ball bearings 39 are travelling along the first part of the load circuit 23A in a left to right direction as shown in FIG. 7, that is towards the first end 117 of the bore 114, the ball bearings 39 enter the second part of the load circuit 23B through the first load circuit mouth 24. Some of the lubricant entrained with the ball bearings 39 will enter the second part 23B of the load circuit and some of the lubricant will continue along the channel formed between the external thread 8 of the screw shaft 4 and the internal thread 120 of the ball nut until it enters the second lubricant sub-chamber 250B.

When the direction of travel of the shuttle 111 is reversed because the direction of rotation of the screw shaft 4 is reversed, that is the shuttle 111 moves towards the second axial end wall 272 of the lubricant chamber 250, the shuttle 111 impels a portion of the lubricant in lubricant sub-chamber 250B into the channel formed between the external thread 8 of the screw shaft 4 and the internal thread 120 of the ball nut 106. The lubricant travels along that channel until it encounters and becomes entrained with the ball bearings 39.

The remainder of the lubricant in lubricant sub-chamber 150B into sub-chamber 150A. This is because both (i) the contact between the radially outer surface 141 of the shuttle 111 and the surface 242 of the of the chamber 250 is not fluid tight, and (ii) there is a resistance to the flow of the lubricant into channel formed between the external thread 8 of the screw shaft 4 and the internal thread 120 of the ball nut 206 because of the one way flow control means 275 that will prevent the lubricant flowing in a direction opposite to the direction shown by arrow 229.

The above description is meant to be exemplary only, and one skilled in the art will recognize that changes may be made to the embodiments described without departing from the scope of the disclosure. Still other modifications which fall within the scope of the present invention will be apparent to those skilled in the art, in light of a review of this disclosure.

Various aspects of the ball screws disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A ball screw comprising:

a screw shaft;

a ball nut; and a load circuit;

wherein:

the load circuit comprises a first and second part; and the screw shaft is longitudinally extending with a longitudinal central axis and at least part of the longitudinally extending surface of the screw shaft comprises an external thread, and the first part of the load circuit comprises a part of the external thread;

the ball nut comprises a body, a bore, and the second part of the load circuit, and a lubricant channel, wherein:

the bore is defined by the body, is longitudinally extending with a longitudinal central axis, has a first end and a second end, and has a longitudinally extending surface extending at least partially between the first and second ends;

the first and second ends of the bore each comprise a mouth, and each mouth opens through an outside surface of the body; and the longitudinally extending surface of the bore comprises an internal thread, and the first part of the load circuit comprises at least a part of the internal thread, and wherein:

the screw shaft extends through the bore of the ball nut and the screw shaft and bore are so configured that they are co-axial, the external thread and internal thread are so configured that the external thread and the internal thread together define the first part of the load circuit;

the first part of the load circuit extends an axial distance along the bore and at least part of the second part of the load circuit extends through the ball nut;

the lubricant channel comprises a first and a second channel end and a flow path between the first and second channel ends;

rotation around the longitudinal axis of one of the screw shaft and the ball nut relative to the other causes axial movement of the ball nut relative to the screw shaft, the ball screw further comprises a shuttle, in which the shuttle is engaged with the longitudinally extending surface of the screw shaft, and the shuttle is in sliding contact with the ball nut; and rotation of one of the screw shaft and the ball nut relative to the other around the longitudinal axis causes the shuttle to impel lubricant through the lubricant channel;

wherein the shuttle is so engaged with the screw shaft and ball nut that when the shuttle is not in contact with an axial end of the lubricant chamber or a stop element, rotation around the central axis of one of the screw shaft and the ball nut relative to the other causes the shuttle to remain in a fixed position relative to the screw shaft and to move axially relative to the ball nut.

2. The ball screw according to claim 1, wherein the ball screw further comprises a lubricant chamber, in which the lubricant chamber is formed in the body of the ball nut and is co-axial with the bore, one end of the lubricant chamber is adjacent one end of the first part of the load circuit and the lubricant chamber extends axially away from both ends of the first part of the load circuit, the shuttle extends into the lubricant chamber and the shuttle is in sliding contact with the surface of the ball nut that defines the radially outer surface of the lubricant chamber.

3. The ball screw according to claim 2, wherein the lubricant chamber extends wholly around the bore in a circumferential direction.

4. The ball screw according to claim 3, wherein the lubricant chamber has the form of a ring toroid.

5. The ball screw according to claim 1, wherein the lubricant channel comprises a means to prevent flow of lubricant in one direction along the lubricant channel.

6. The ball screw according to claim 1, wherein the ball nut further comprises a lubricant reservoir, and the lubricant reservoir and the lubricant channel are so configured that the lubricant channel intersects and is in communication with the lubricant reservoir.

7. The ball screw according to claim 2, wherein the ball screw further comprises at least one ball nut seal, each ball nut seal extends between the body of the ball nut and the screw shaft, and one ball nut seal is located adjacent the end of the first part of the load circuit that is remote from the lubricant chamber.

8. The ball screw according to claim 1, wherein the shuttle is engaged with the longitudinally extending surface of the screw shaft via an internal thread that engages with the external thread on the screw shaft.

9. The ball screw according to claim 1, wherein a portion of the lubricant channel extends through the shuttle.

10. The ball screw according to claim 2, wherein the shuttle divides the lubricant chamber into first and second sub-chambers.

11. A ball screw comprising:

a screw shaft;

a ball nut; and a load circuit;

wherein:

the load circuit comprises a first and second part; and the screw shaft is longitudinally extending with a longitudinal central axis and at least part of the longitudinally extending surface of the screw shaft comprises an external thread, and the first part of the load circuit comprises a part of the external thread;

the ball nut comprises a body, a bore, and the second part of the load circuit, and a lubricant channel, wherein:

the bore is defined by the body, is longitudinally extending with a longitudinal central axis, has a first end and a second end, and has a longitudinally extending surface extending at least partially between the first and second ends;

the first and second ends of the bore each comprise a mouth, and each mouth opens through an outside surface of the body; and the longitudinally extending surface of the bore comprises an internal thread, and the first part of the load circuit comprises at least a part of the internal thread, and wherein:

the screw shaft extends through the bore of the ball nut and the screw shaft and bore are so configured that they are co-axial, the external thread and internal thread are so configured that the external thread and the internal thread together define the first part of the load circuit;

the first part of the load circuit extends an axial distance along the bore and at least part of the second part of the load circuit extends through the ball nut;

the lubricant channel comprises a first and a second channel end and a flow path between the first and second channel ends;

rotation around the longitudinal axis of one of the screw shaft and the ball nut relative to the other causes axial movement of the ball nut relative to the screw shaft, the ball screw further comprises a shuttle, in which the shuttle is engaged with the longitudinally extending surface of the screw shaft, and the shuttle is in sliding contact with the ball nut; and rotation of one of the screw shaft and the ball nut relative to the other around the longitudinal axis causes the shuttle to impel lubricant through the lubricant channel;

wherein the lubricant channel divides into a first and second lubricant spur at a junction, the first and second lubricant spurs are in fluid communication with the junction via a first and second mouth, and the junction comprises a blocking means, where in the blocking means is adapted to move between a first configuration and a second configuration in which the first configuration is one in which the mouth of the first lubricant spur into the junction is open and the mouth of the second lubricant spur into the junction is closed by the blocking means, and the second configuration is one in which the mouth of the second lubricant spur into the junction is open and the mouth of the first lubricant spur into the junction is closed by the blocking means.

12. A ball screw comprising:

a screw shaft;

a ball nut; and a load circuit;

wherein:

the load circuit comprises a first and second part; and the screw shaft is longitudinally extending with a longitudinal central axis and at least part of the longitudinally extending surface of the screw shaft comprises an external thread, and the first part of the load circuit comprises a part of the external thread;

the ball nut comprises a body, a bore, and the second part of the load circuit, and a lubricant channel, wherein:

the bore is defined by the body, is longitudinally extending with a longitudinal central axis, has a first end and a second end, and has a longitudinally extending surface extending at least partially between the first and second ends;

the first and second ends of the bore each comprise a mouth, and each mouth opens through an outside surface of the body; and the longitudinally extending surface of the bore comprises an internal thread, and the first part of the load circuit comprises at least a part of the internal thread, and wherein:

the screw shaft extends through the bore of the ball nut and the screw shaft and bore are so configured that they are co-axial, the external thread and internal thread are so configured that the external thread and the internal thread together define the first part of the load circuit;

the first part of the load circuit extends an axial distance along the bore and at least part of the second part of the load circuit extends through the ball nut;

the lubricant channel comprises a first and a second channel end and a flow path between the first and second channel ends;

rotation around the longitudinal axis of one of the screw shaft and the ball nut relative to the other causes axial movement of the ball nut relative to the screw shaft, the ball screw further comprises a shuttle, in which the shuttle is engaged with the longitudinally extending surface of the screw shaft, and the shuttle is in sliding contact with the ball nut; and rotation of one of the screw shaft and the ball nut relative to the other around the longitudinal axis causes the shuttle to impel lubricant through the lubricant channel;

wherein the shuttle is so engaged with the screw shaft that when the shuttle is in contact with an axial end of the lubricant chamber or a stop element rotation around the central axis of one of the screw shaft and the ball nut relative to the other causes the shuttle to remain in a fixed position relative to the ball nut and to move axially relative to the screw shaft.

13. The ball screw according to claim 1, wherein there are a plurality of external threads, an equal number of internal threads, and at least an equal number of load circuits.

14. The ball screw according to claim 1, wherein which in which the ball screw further comprises a lubricant, and the lubricant is an oil or a grease.

* * * * *